I. L. MILLER.
NUT LOCK.
APPLICATION FILED MAY 18, 1908.
985,273.
Patented Feb. 28, 1911.
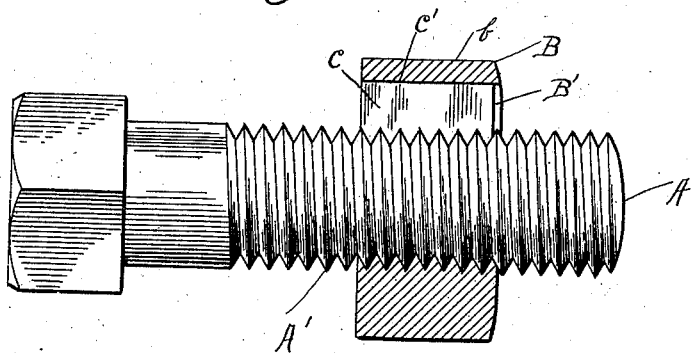
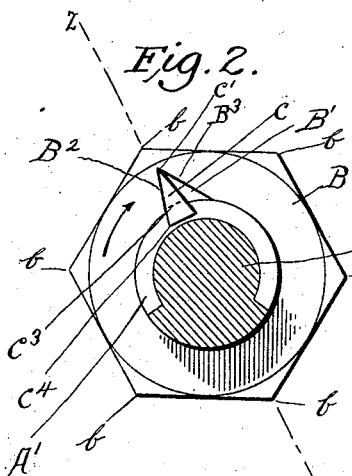 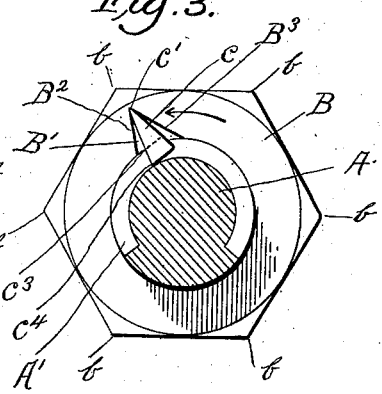
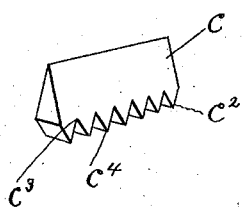
WITNESSES:
L. Ashley
Frank Dobler
INVENTOR
Isaac L. Miller
BY
Frank M. Ashley
ATTORNEYS

UNITED STATES PATENT OFFICE.

ISAAC L. MILLER, OF NEW YORK, N. Y., ASSIGNOR, BY DIRECT AND MESNE ASSIGNMENTS, TO UNIVERSAL LOCK-NUT & BOLT COMPANY, A CORPORATION OF NEW JERSEY.

NUT-LOCK.

985,273.    Specification of Letters Patent.    Patented Feb. 28, 1911.

Application filed May 18, 1908. Serial No. 433,380.

*To all whom it may concern:*

Be it known that I, ISAAC L. MILLER, a citizen of the United States, and resident of New York city, in the county of Kings and State of New York, have invented certain new and useful Improvements in Nut-Locks, of which the following is a specification.

My invention relates to improvements in nut locks, and the object of my invention is to provide a nut which will fit a standard bolt, or may be made to fit any desired size of bolt which is not of standard dimensions, and may be made and sold to fit standard bolts, as a separate article of manufacture, and has means for engaging with the bolt to prevent the nut from being unscrewed from the bolt.

My invention consists in the novel features of construction described herein and pointed out in claims presented herewith.

Referring to the drawings which form part of this specification, Figure 1, is a longitudinal exterior view of a bolt with my improved nut shown in section, and mounted on said bolt, and discloses a side view of the locking member located therein in locked engagement with the bolt. Fig. 2, is an end view of the nut, mounted on the bolt, the latter being shown in cross section, and the locking member of the nut being shown in its unlocked position on the bolt. Fig. 3, is a similar view to that shown in Fig. 2, except that the nut is shown in locked relation to the bolt. Fig. 4, is a perspective view of the locking member.

A, indicates the bolt; B, the nut, and C, the locking member. The nut is provided with a recess B', preferably located opposite to one of the projecting portions $b$, in order to retain the strength of the nut as far as possible, and the shape of the recess is preferably about as shown, that is, the walls $B^2$ and $B^3$ are at an acute angle to the dotted line Z—Z.

The wedge shaped member C is provided with a sharp edge at its upper end, and is of less width than the recess B', and its length is nearly as long as the nut is wide, and is formed substantially as shown in the drawings. The wedge shaped member C is provided with a threaded face $C^2$ the threads whereof are formed to conform to the threads of the bolt having the same pitch. The bottom $C^3$ of the threads of the threaded face rests normally on the top of the thread of the bolt as shown in Fig. 2, when the nut is being screwed forward onto the bolt, the lower edge $C^4$ resting short of the bottom of the thread A' as illustrated in Fig. 2, and the side wall of the wedge member C resting against the wall $B^2$, and in this position the nut can be screwed freely on the bolt in the forward direction.

When the nut is screwed into its tightened position on the bolt the member, C, is under the frictional strain of the engagement. When the nut starts to reverse, or unscrew, the member, C, rocks upon the edge C', the least resistance being offered to this operation. In thus rocking, the bottom of the thread of the member, C, is lifted slightly out of the contact with the top of the thread of the bolt, except the front edge of the member, C, which is caused to bite the top of the bolt thread. By reason of the triangular shape of the member, C, the length of the thread on the said member in line with the side of the triangle is a trifle more than the height of the thread. In rocking the member, C, the front edge of the member is moved toward the line between the edge, C', and the center of the bolt, and thus the extra length or depth of the thread at this point operates to extend to the bottom of the bolt thread. When the top of the thread on the member, C, touches the bottom of the thread in the bolt it will be noticed that a lock is complete. The three fixed points to wit; the pivot, C', the bottom of the threads on the member, C, and the top of the threads of the member, C, are all in engagement, and the nut is prevented from further movement. Damage to the thread of the bolt which might be caused by the digging of the threaded face of the member, C, is also avoided. It will be noted that the wedge member C therefore tends to rock on the thread A' at $C^3$, and that the gripping action takes place at this point, and that the lower edge of the thread at $C^4$ prevents the element C from rocking to the wall $B^3$ by reason of its abutment and pressure against the bottom of the thread A'.

This construction insures durability in use, and ease of operation. In case it is desired to unscrew the nut from the bolt, a pin is inserted and the wedge C forced to the wall $B^2$, and held there while the nut is rotated to remove the same from the bolt.

Having thus described my invention, what

I claim as new and desire to secure by Letters Patent is,

1. A nut lock comprising, a nut of the character described having a V-shaped recess therein, and a V-shaped rocking member of less width than the said recess, and having a face at the inner end threaded to register with the thread on the nut when in the unlocked position of said locking member, the bottom of the thread in said member resting normally on the top of the thread of the bolt, and the threads of the said locking member being formed of less height than the height of the thread in the bolt, and adapted to engage the bottom of the thread on the bolt when said member is rocked in locking position.

2. A nut lock comprising, a nut of the character described having a V-shaped recess therein, and a V-shaped rocking member of less width than the said recess and of a length nearly the length thereof and having a face at the inner end threaded to register with the threads of the nut when in unlocked position, the bottom of the said thread in said locking member resting normally on the top of the thread of the bolt, and said threads being formed of less height than the threads in the bolt, and adapted to engage the bottom of the thread on the bolt when said locking member is rocked to locked position.

Signed at New York city in the county of New York and State of New York this sixteenth day of May A. D. 1908.

ISAAC L. MILLER.

Witnesses:
 FRANK M. ASHLEY,
 JULIUS L. MENDEL.

---

Copies of this patent may be obtained for five cents each, by addressing the "Commissioner of Patents, Washington, D. C."